United States Patent

[11] 3,589,136

| [72] | Inventors | James E. Sorenson;<br>Thomas J. Atterbury, both of Columbus, Ohio |
|---|---|---|
| [21] | Appl. No. | 655,566 |
| [22] | Filed | July 24, 1967 |
| [45] | Patented | June 29, 1971 |
| [73] | Assignee | Columbus Gas System Service Corporation<br>New York, N.Y. |

[54] METHOD AND APPARATUS FOR CONTROLLING A CONDUIT DURING A LAYING OPERATION
3 Claims, 7 Drawing Figs.

| [52] | U.S. Cl. | 61/72.3 |
|---|---|---|
| [51] | Int. Cl. | F16l 1/00,<br>B63b 35/04 |
| [50] | Field of Search | 61/72.3,<br>72.4, 72.1 |

[56] References Cited
UNITED STATES PATENTS

| 3,273,346 | 9/1966 | Delaruelle | 61/72.3 |
| 3,438,213 | 4/1969 | Broussard et al. | 61/72.3 |
| 1,220,189 | 3/1917 | Chapman | 61/72.3 |
| 2,910,835 | 11/1959 | Timothy | 61/72.3 |
| 3,214,921 | 11/1965 | Goepfert et al. | 61/72.3 |
| 3,280,571 | 10/1966 | Hauber et al. | 61/72.1 |
| 3,321,925 | 5/1967 | Shaw | 61/72.3 |
| 3,347,054 | 10/1967 | Sherrod | 61/72.4 |
| 3,390,532 | 7/1968 | Lawrence | 61/72.3 |

*Primary Examiner* — Jacob Shapiro
*Attorney* — Pennie, Edmonds, Morton, Taylor and Adams ABSTRACT: This disclosure relates to a method and apparatus for controlling the curvature of a flexible continuous conduit during the delivery of the conduit from a marine vessel to a position on an underwater surface. An elongated conduit support member, which is constructed to permit its configuration to be varied, supports the conduit and controls its curvature during the delivery and laying of the conduit.

PATENTED JUN 29 1971

INVENTORS
JAMES E. SORENSON
THOMAS J. ATTERBURY

BY *Pennie Edmonds Morton Taylor Adams*

ATTORNEYS

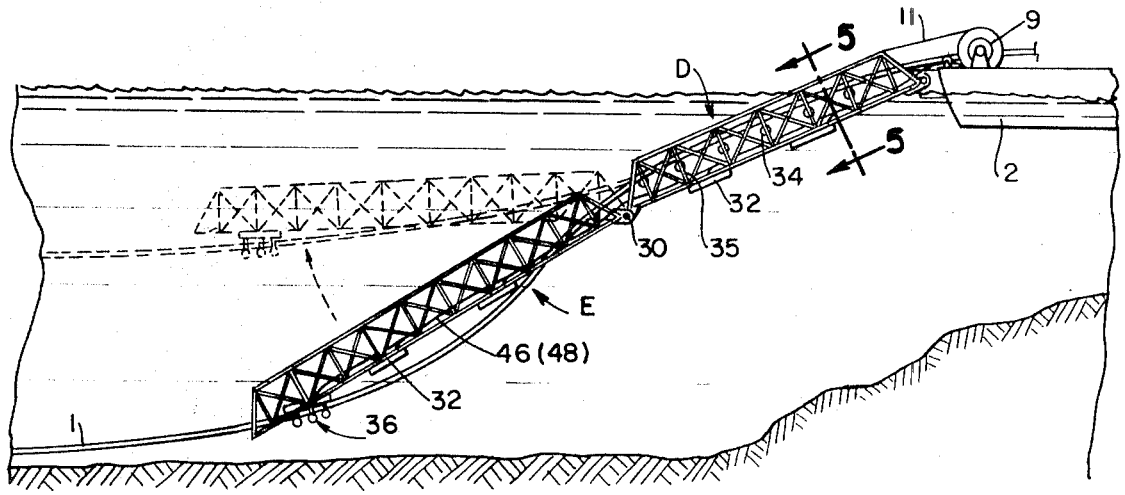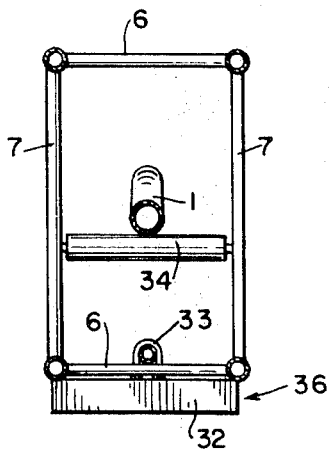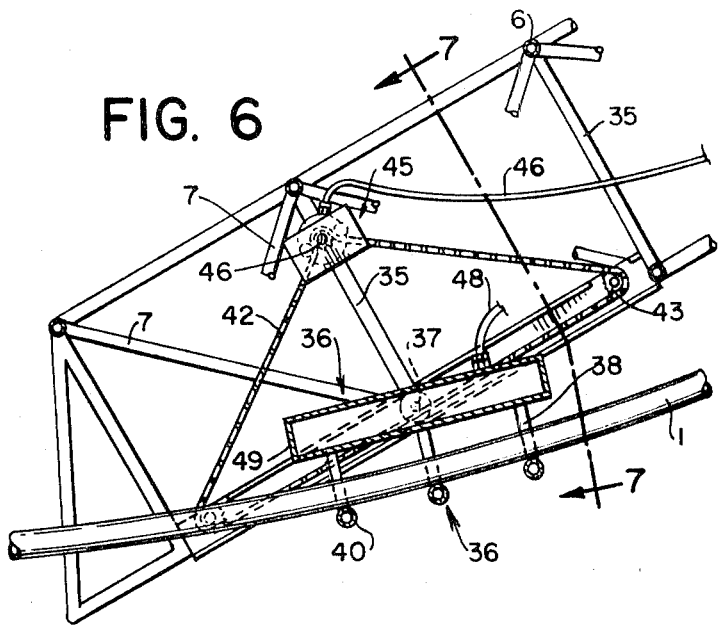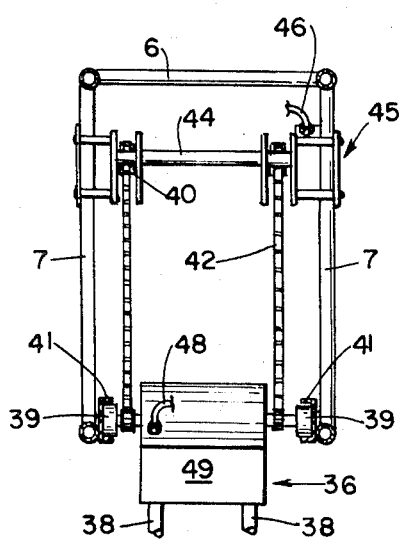

METHOD AND APPARATUS FOR CONTROLLING A CONDUIT DURING A LAYING OPERATION

BACKGROUND OF THE INVENTION

In the laying of continuous flexible conduits, such as underwater pipelines and electrically conductive cables, it is desired that the stress and strains induced in the conduit be maintained as small as practicable. In particular it is necessary to maintain the maximum strains induced below that amount which will cause damage to the conduit, and it has therefore been understood that conduits of reduced size, weight and strength could be used if the maximum strain during the laying operation were reduced. Since the stress and strain induced in a conduit is substantially inversely proportional to the radius of curvature of the conduit, it is desired that the conduit be laid in such a manner that the radii of the curvatures are maintained as large as practicable.

Many methods and apparatus have been used to support submarine conduits during the laying operation but none have included apparatus for effectively and reliably controlling the curvature of the pipeline throughout its delivery such that strain in the conduit is continuously maintained below an acceptable maximum amount.

SUMMARY OF THE INVENTION

The present invention provides a method and apparatus for continuously controlling the curvature of a flexible conduit as it is delivered from a marine vessel and laid on an underwater surface below and further provides means for varying the curvature of the conduit as the depth of the water varies.

Broadly, the present invention comprises a method and apparatus for controlling a flexible conduit during the laying operation comprising an elongated conduit support stinger member having tandemly arranged sections for supporting the conduit, the stinger member being supported by a vessel with one of its ends adjacent the vessel and the other end positioned near the underwater surface. The apparatUs used includes means for orienting the stinger sections with respect to each other and the vessel to vary the configuration of the stinger and selectively support the conduit in the desired curvature. The stinger sections may be oriented using hoists positioned on the vessel and by the use of buoyant devices having variable buoyancy.

It is a feature of the invention that the curvature of the conduit is continuously controlled throughout its delivery from the vessel to the underwater surface.

It is a further feature of the invention that the orientation of the stinger sections may be automatically controlled by means which are responsive to the angle between the vessel and the stinger and responsive to the depth of the water.

BRIEF DESCRIPTION OF THE DRAWINGS

In the drawings.

FIGS. 4, 5, 6 and 7 show another embodiment of the invention.

DESCRIPTION OF THE PREFERRED EMBODIMENTS

Figure 1:
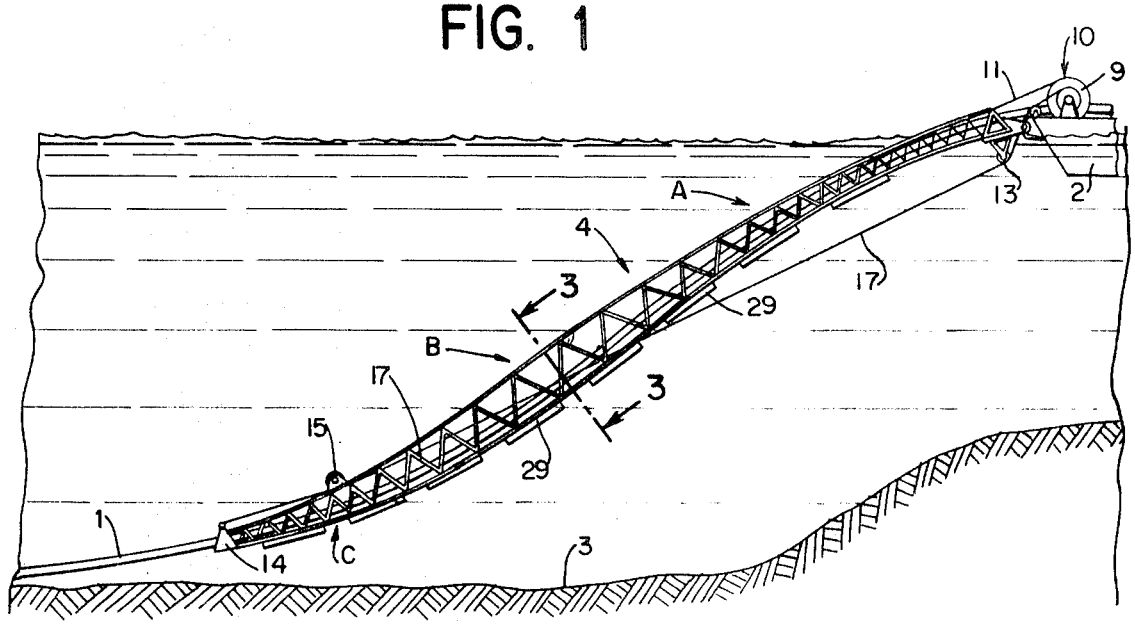
FIG. 1 is a side elevation view of an apparatus in accordance with the invention.
Figure 2:
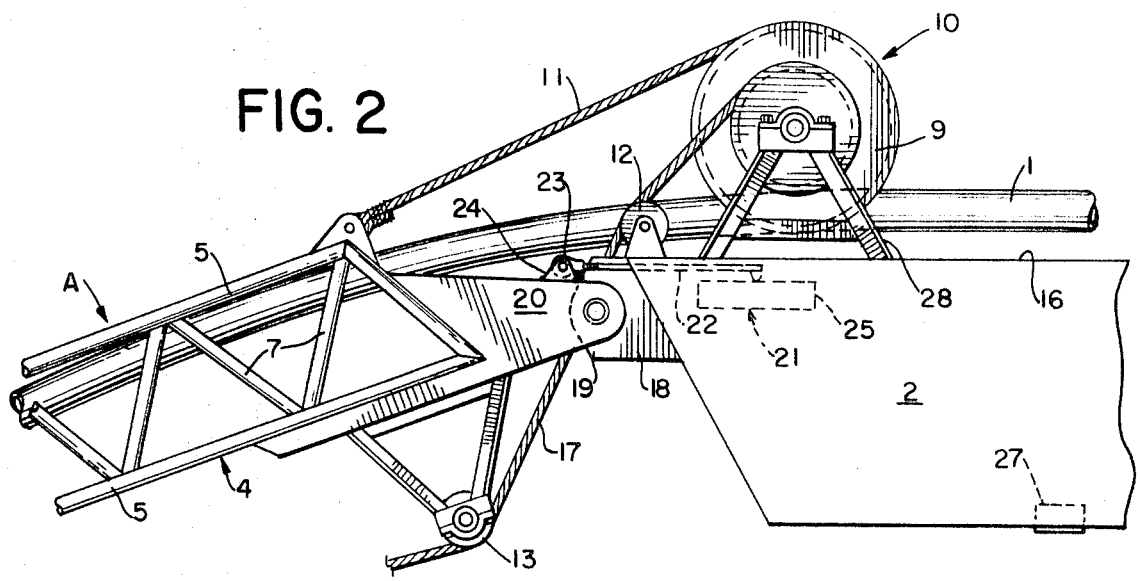
FIG. 2 is an enlarged elevation view of the end of the stinger mounted on the stern of a conduit laying vessel.
Figure 3:
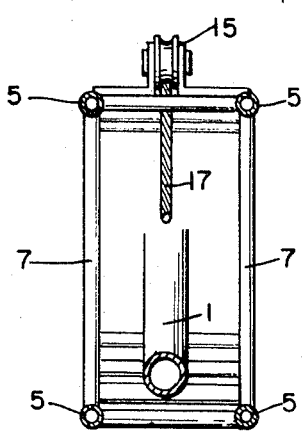
FIG. 3 is a sectional view taken along line 3–3 of FIG. 1.

In FIGS. 1, 2 and 3 of the drawings there is shown an embodiment of the invention in which a pipeline 1 is delivered from the stern of marine vessel 2 to a variable depth underwater surface 3. Pipeline 1 is paid out over the stern of vessel 2 by forces created by the forward movement of the vessel and by the weight and drag of the pipeline. Additional apparatus for urging the pipeline overboard may be used if additional forces are necessary to start or continue delivery of the pipeline during the laying operation.

Pipeline 1 may be paid out or delivered from a locker in the vessel or it may be stored on the vessel in any other suitable manner. It is also contemplated that a pipeline of connectable length may be laid, connections being made on the vessel to permit an uninterrupted laying operation.

Pipeline 1 is supported and controlled by a structural support member of stinger 4 which is towed by the vessel in such a manner that the lower end of the stinger is maintained above and near to the underwater surface 3. Stinger 4 is flexible and includes three tandemly arranged sections A, B and C which can be oriented with respect to each other and the vessel to form the stinger is a generally S-shaped configuration. The three sections of stinger 4 are integrally formed using four longitudinal members 5 (FIG. 3) strengthened by crosspieces 6 and braces 7. Braces 7 are made of varying length so that upper section A and lower section C are smaller in cross section than middle section B. This variation in cross section of stinger 4 over its length facilitates bending of the stinger to assume various S-shaped configurations. The size, weight and its material composition of longitudinal members 5, crosspieces 6 and braces 7 are selected to provide adequate strength while providing a stinger flexible enough to be bent to the desired configurations.

Stern extension 18 on the stern of the vessel carries rod 19 around which stinger wings 20 turn to permit the stinger to be properly positioned with respect to the vessel depending on water depth, water activity and so forth. The angle between stinger 4 and vessel 2 is continuously sensed by sensor unit 21 which includes arm 22 pivotable around pin 23 of wing bracket 24. Arm 22 moves horizontally on track 25 to sense the angle of the stinger which may be recorded or displayed on a viewer (not shown), or alternatively, track 25 may have contact switches (not shown) to energize winch 10 on deck 16 when section A of the stinger required repositioning. Winch 10 may alternatively be controlled by signals from depth finder 27, winch 10 including larger drum 9 being turned to urge the stinger up or down through hoisting cable 11.

The S-shaped curvature of the stinger is produced and varied by tensioning and relaxing cable 17 by rotating smaller drum 8 of winch 10 clockwise to tension and increase the S-shaped curvature and counterclockwise to relax and decrease the curvature. Cable 17 is connected to pylon 14 on section C and is guided by pulleys 12, 13 and 15. The stinger sections are oriented with respect to each other and the vessel to form an S-shaped configuration for the reason that the resulting change in the curvature of the supported conduit reduces strain in the conduit. The S-shaped configuration also permits laying of the pipeline in deeper water with a shorter more easily handled stinger. As the water increases in depth the winch 10 which carries both drums is turned clockwise urging upward section A of the stinger and increasing the S-shaped curvature. If desired, a suitable gear and clutch arrangement may be used to permit drum 8 and drum 9 to be independently driven. Buoyancy tank 29 secured to the underside of the stinger urge the stinger upwardly.

In the operation of this embodiment of the invention, pipeline 1 is inserted through structure support member or stinger 4 and the stinger is then lowered to its towed position and connnected to stern extension 18, the conduit being supported on the crosspieces 6 of the stinger. Alternatively, the pipeline may be inserted through the stinger after the stinger has been connected to the stern of the vessel. Cables 11 and 17 are connected to the stinger and the orientation of stinger sections A, B and C with respect to each other and the vessel is adjusted such that the stinger has the desired S-shaped configuration and its lower end is near underwater surface 3. The angle between stinger section A and the vessel is sensed by sensor unit 21 which may be used to automatically operate winch 10 to raise, lower and flex the stinger.

As the depth of the water varies, the stinger is raised, lowered and flexed to prevent the stinger from engaging the underwater surface while maintaining its lower end near to the surface to prevent excessive bending of the pipeline as it leaves the lower end of the string and is laid on the surface.

In FIGS. 4—7 of the drawings there is shown another embodiment of the invention in which the numbers used correspond with those of FIGS. 1—3 and in which stinger 4 has two rigid sections D and E connected through a hinge 30 permitting the lower section E to be raised or lowered (see dashed line portion of FIG. 4). While more than two sections of varying lengths may be used, two are preferred and it has been found that the upper section is preferably one quarter to one-half the overall length of the stinger. Upper section D is mounted on vessel 2 in the same manner as the stinger shown in FIG. 1, its angle with vessel 2 being varied and controlled using drum 9 and cable 11. The stinger sections are further supported by air tanks 32 connected to the underside of the stinger by fasteners 33 (FIG. 5).

Pipeline 1 is supported by upper stinger section D through rollers 34 suitably positioned between struts 35. The stinger sections of this embodiment are not designed to be flexed and include braces 7 in addition to struts 35, braces 7 in FIG. 6 being broken away to permit better illustration therein. Rollers 34 may be positioned at varying positions along struts 35 to support the pipeline in the desired position as it is delivered from vessel 2.

Pipeline 1 is supported by lower stinger section E by support unit 36 freely pivotable about axle 37, the forces exerted on the three supports 38 by pipeline 1 determining the orientation of unit 36. Unit 36 pivots to accommodate and support pipeline 1 to reduce strain in the pipeline as it is being laid. Axle 37 has wheels 39 affixed to its ends for rolling movement along stationary tracks 41. Drive chains 42 which are secured to axle 37, are supported by idler sprockets 43 and are driven through drive sprockets 40 secured to shaft 44, which shaft is in turn driven by air motor 45 causing hanger unit 36 to be moved along tracks 41. Air motor 45 is powered and controlled by air pressure in air supply hose 46. Suitable mechanisms may be used in motor 45 to provide reversal of shaft 44 when the air pressure is sufficiently reduced or when axle 37 engages either of lower idler sprockets 43, thus permitting the support unit to move in both directions for selected positioning.

Buoyance air supply hose 48 is connected to tank 49 and stationary buoyancy tanks 32 to permit the buoyancy of the tanks to be increased by forcing water out of suitably formed outlets (not shown) in the tanks or permitting water to fill the tanks through such outlets. Supply and control of air in hoses 46 and 48 is provided by suitable equipment on the vessel. Hoses 46 and 48 are preferably wound together to facilitate their support on the stinger.

In the operation of this embodiment of the invention, pipeline 1 is supported on rollers 34 of Section D and on rollers 40 of the support unit 36 which is positioned on section E for reciprocatory movement thereon. Where the curvature of the pipeline as it leaves the vessel is greater due to a lower position of section E, rollers 34 at the end portions of section D will support a substantial amount of the weight of the pipeline. When section E is raised as the depth of the surface 3 lessens, the curvature of the pipeline over rollers 34 changes permitting more even distribution of weight on the rollers. The position of section D is controlled by tensioning cable 11 wound on large drum 9 and by varying the buoyancy of its tanks 32. The position of section E is controlled by varying the buoyancy of its tanks 32 and support unit tank 49.

The curvature of pipeline 1 is further controlled by changing the position of support unit 36. If support unit 36 is moved toward the lower end of the section E the section will tend to swing toward the underwater surface since the weight of the pipeline is moved away from the center of buoyancy of the section. Support unit 36 may be moved toward the vessel to raise section E.

We claim:

1. A method of laying a length of flexible conduit positioned substantially in an S-shaped configuration during its movement between a conduit-carrying vessel and the underwater surface comprising a. connecting to the conduit-carrying vessel an elongated stinger formed of tandemly arranged sections which stinger has an effective length such that both the convex portion of the S-shaped conduit configuration which is closer to the vessel and the concave portion of the conduit which is farther from the vessel are supportable by the stinger, b. moving the vessel forward to tow the stinger through the water, c. supporting the conduit at a plurality of positions along the stinger in such a manner that the conduit is supported at one or more positions on both the convex portion of its S-shaped curvature and at one or more positions on the concave portion, and d. controlling the stinger using both tensioning means mounted on the vessel and buoyancy means mounted on the stinger to maintain S-shaped curvature of the conduit during its movement between the vessel and the underwater surface.

2. An apparatus for guiding a flexible continuous conduit in a S-shaped configuration during its delivery from a marine vessel to an underwater surface of varying depth, comprising a. an elongated conduit support member connected to the vessel and spaced from the underwater surface for supporting both the convex portion of the S-shaped configuration of the conduit which portion is near the vessel and the concave portion of the S-shaped configuration of the conduit which portion is farther from the vessel, the support member in turn comprising a plurality of tandemly arranged elongated sections having a first section pivotably connected to the vessel and a second section pivotably joined end-to-end to the first section in such a manner that the joined sections are capable of being oriented with respect to one another and with respect to the vessel to form a support member selectively positionable in different orientations including orientations in which the angle of descent of the first section is less than the angle of descent of another section;

b. support means on the support member for supporting the conduit at spaced-apart positions to permit the conduit to be formed and maintained in a generally S-shaped configuration when said support member sections are selectively oriented, said support means in turn comprising, 1. convex reduced-frictional slide means extending along a substantial length of and secured to the said first support member section to support the conduit in a convex configuration as it moves between the said vessel and said first section;

2. a conduit support element attached to the second support member section and positioned at the lower end portion of the support member for supporting, in cooperation with the said slide means, the conduit in a concave configuration as it moves between the first section and the underwater surface;

c. orientation means for orienting said support member sections, the orientation means in turn comprising, 1. cable tensioning means mounted on the vessel and connected to the first member section of the stinger to raise and lower the section; and 2. buoyancy means connected to the second support member for urging the member upwardly.

3. A method of laying a length of flexible conduit positioned substantially in an S-shaped configuration during its movement between a conduit-carrying vessel and the underwater surface comprising a. connecting to the conduit-carrying vessel an elongated stinger formed of a first and second tandemly arranged sections which stinger has an effective length such that both the convex portion of the S-shaped conduit configuration which is closer to the vessel and the concave portion of the conduit which is farther from the vessel are supportable by the stinger;

b. moving the vessel forward to tow the stinger through the water;

c. supporting the conduit through the stinger sections at a plurality of positions along the stinger in such a manner that the conduit is supported at one or more positions at both the convex portion of its S-shaped curvature and at one or more positions on the concave portion, and
d. controlling the stinger using cable tensioning means mounted on the vessel for raising and lowering the first stinger section and buoyancy means mounted on the second stinger section to raise and lower the stinger and to rotate the second stinger section to maintain S-shaped curvatUre of the conduit during its movement between the vessel and the underwater surface.